Feb. 18, 1958   C. A. GONGWER ET AL   2,823,636
VESSEL

Filed Feb. 18, 1955   7 Sheets-Sheet 1

INVENTORS
CALVIN A. GONGWER
GEORGE M. McROBERTS III
BY
ATTORNEY

Feb. 18, 1958  C. A. GONGWER ET AL  2,823,636
VESSEL

Filed Feb. 18, 1955  7 Sheets-Sheet 2

INVENTORS
CALVIN A. GONGWER
GEORGE M. McROBERTS III
BY
ATTORNEY

Feb. 18, 1958   C. A. GONGWER ET AL   2,823,636
VESSEL
Filed Feb. 18, 1955   7 Sheets-Sheet 3

INVENTORS
CALVIN A. GONGWER
GEORGE M. McROBERTS III
BY
ATTORNEY

Feb. 18, 1958   C. A. GONGWER ET AL   2,823,636
VESSEL

Filed Feb. 18, 1955   7 Sheets-Sheet 4

INVENTORS
CALVIN A. GONGWER
GEORGE M. McROBERTS III
BY
ATTORNEY

Feb. 18, 1958  C. A. GONGWER ET AL  2,823,636
VESSEL

Filed Feb. 18, 1955  7 Sheets-Sheet 5

INVENTORS
CALVIN A. GONGWER
GEORGE M. McROBERTS III
BY
ATTORNEY

Feb. 18, 1958  C. A. GONGWER ET AL  2,823,636
VESSEL

Filed Feb. 18, 1955  7 Sheets-Sheet 6

INVENTORS
CALVIN A. GONGWER
GEORGE M. McROBERTS III
BY
ATTORNEY

Feb. 18, 1958    C. A. GONGWER ET AL    2,823,636
VESSEL

Filed Feb. 18, 1955    7 Sheets-Sheet 7

INVENTOR.
CALVIN A. GONGWER
GEORGE M. McROBERTS III
BY
ATTORNEY.

United States Patent Office 2,823,636
Patented Feb. 18, 1958

2,823,636

VESSEL

Calvin A. Gongwer, Glendora, and George M. McRoberts III, Sierra Madre, Calif., assignors to Aerojet-General Corporation, Azusa, Calif., a corporation of Ohio Application February 18, 1955, Serial No. 489,085

14 Claims. (Cl. 114—16)

This invention relates to vessels adapted to travel through fluid media, and in particular to submarine vessels of miniature size adapted for use ordinarily by one or two or perhaps a few persons.

The term "vessel" as used in this specification means craft such as airships, blimps, submarines or submersible boats, and like craft, which travel through or on water or through air. The term "hull" means the outer skin or covering of such craft.

An object of this invention is to provide an underwater craft of lightweight design requiring a minimum of hull structure to withstand water pressure when submerged, and having a configuration favorable to the easy passage of the boat through the water.

Another object of this invention is to provide a versatile unitary steering means for craft adapted to travel through either air or water.

Another object is to provide a craft which is easily maneuverable into any attitude with respect to its principal axes.

An optional object is to provide propulsive means which do not exert torque on the hull by their operation.

A feature of this invention resides in the provision of a submersible craft, substantially all of which may be flooded, if desired, including the operator's compartment. This feature reduces the amount of structure needed in the hull to resist outside water pressure when the boat is submerged, since the water pressure inside and out may be equalized, if desired.

Another feature resides in unique triaxial controls by means of which the craft may be directed into any attitude about its principal axes.

An optional feature resides in counter-rotating coaxial propeller shafts to which propellers are rigidly affixed so as to give propulsive force without substantial torque on the hull during operation. The propulsive force may be furnished by the operator or operators, as by foot-pedal operation; and a feature resides in the drive for doing this.

These and other features of this invention will be fully understood from the following detailed description and the accompanying drawings, in which.

Figure 1:
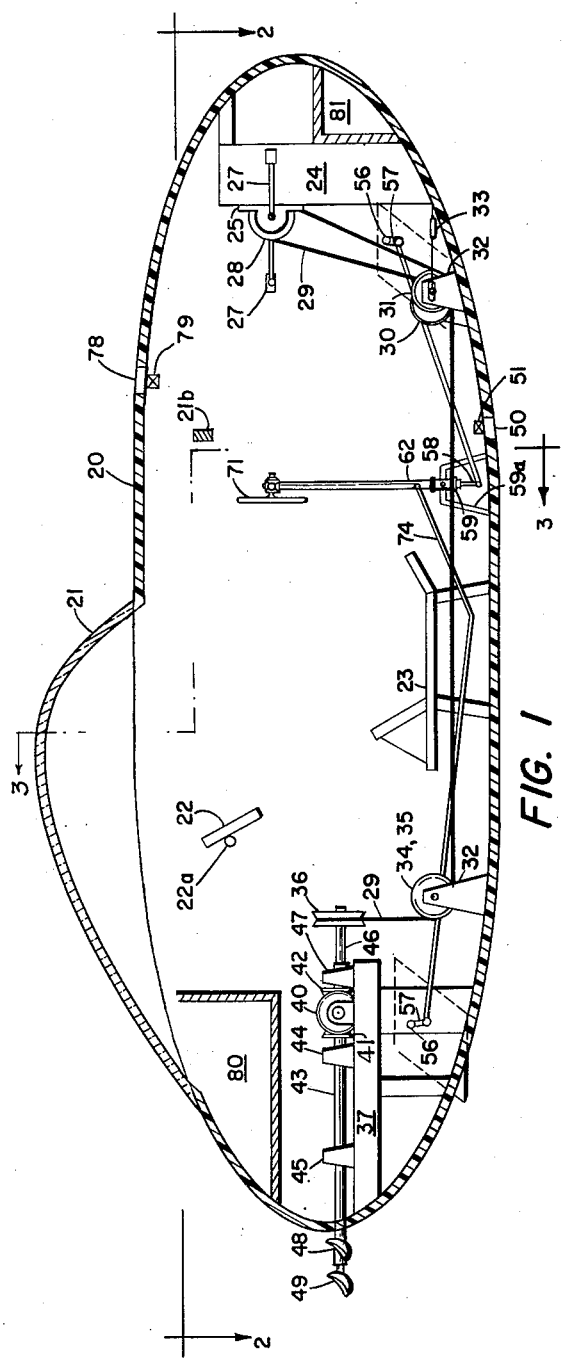
Fig. 1 is a side elevation, partly in cross section, of a submersible boat arrangement according to the invention.
Figure 2:
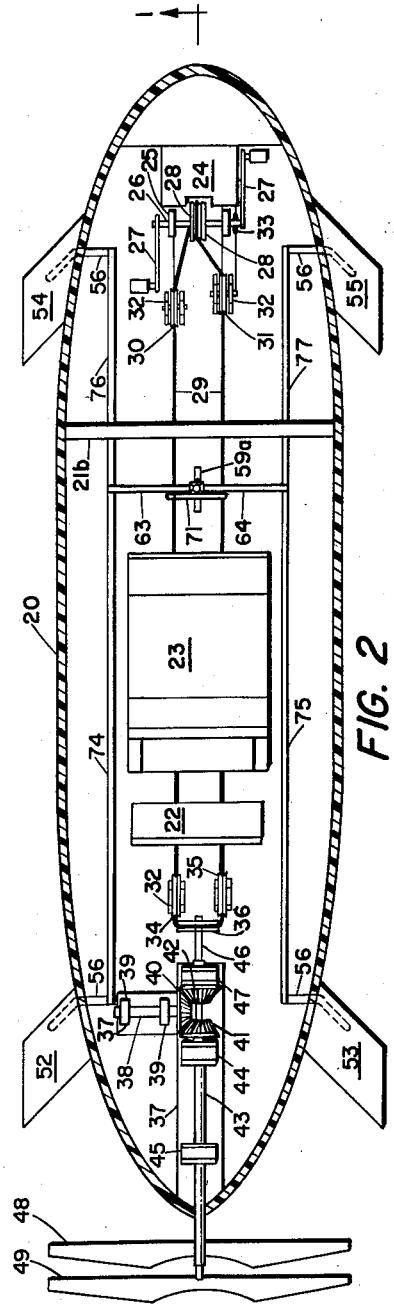
Fig. 2 is a plan view taken along line 2—2 of Fig. 1, with some parts in cutaway view.
Figure 3:
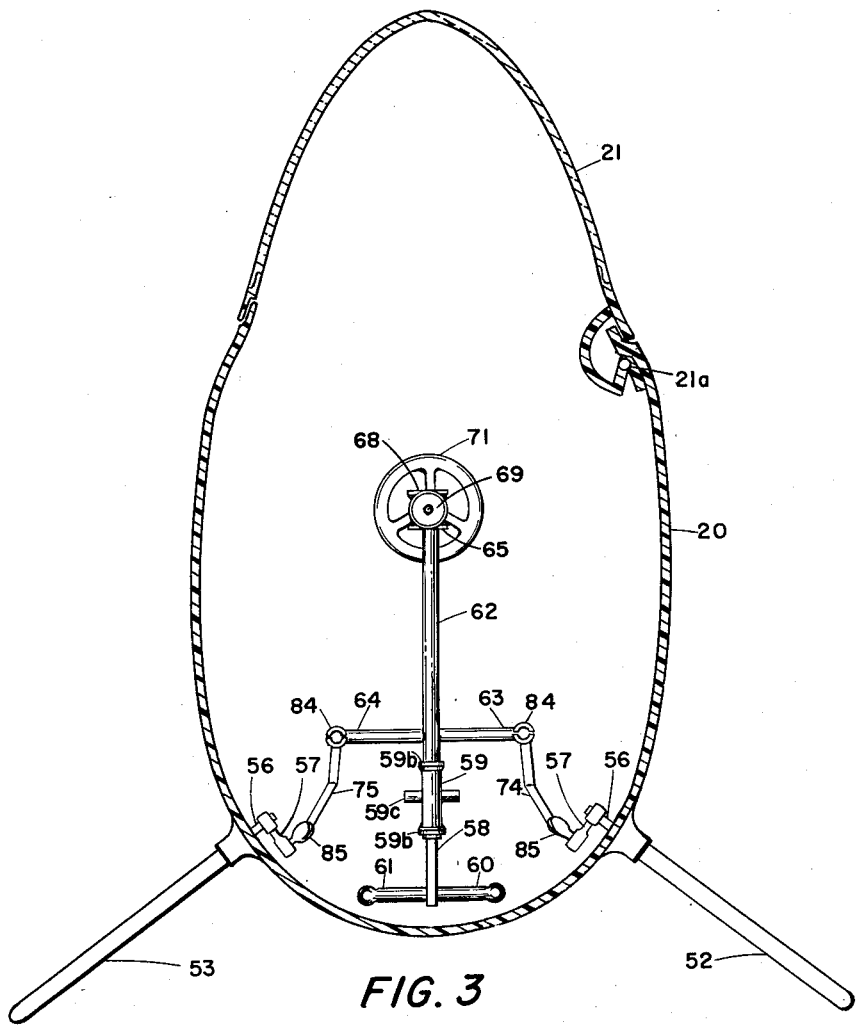
Fig. 3 is a side elevation in cross-section taken along line 3—3 of Fig. 1.

A submersible craft is shown in Figs. 1–3 which comprises an outer hull 20 in generally streamlined form with a transparent canopy 21 at the top to permit an operator to see outside the hull.

Figure 3A:
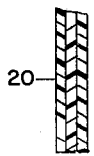
Fig. 3A is an enlarged view of a portion of the hull 20 shown in Fig. 3.

The hull 20 may be made of plastic-impregnated glass cloth, preferably of about three layers of such cloth as shown in Fig. 3A. Compression resisting cross members 21b may also be provided to hold the walls apart, although when the boat is flooded in operation, such extra structure will not ordinarily be necessary. The canopy can be longitudinally pivoted on pivot 21a to serve as an access hatch to the inside of the hull. The inside of the hull is fitted with backrests 22 and 22a and a seat 23 to accommodate an operator in a sitting, semi-recumbent position. The operator is positioned between driving and propulsive means to be described.

Propulsive force for this craft is derived from leg movement of the operator. A bracket 24 is rigidly affixed to the hull, and a journal 25 is mounted to the bracket. A shaft 26 rotates in the journal, and pedal assemblies 27, one on each side of the journal, are mounted to the shaft. The operator turns the cranks in the same manner as though he were riding a bicycle. A main drive wheel 28 is affixed to shaft 26 so as to turn therewith, and a long flexible member 29 such as a cable or chain passes over it in close engagement. It will be appreciated that the drive wheel may be a pulley in engagement with a cable as shown, or a sprocket in engagement with a chain, if preferred. When the main drive wheel 28 is turned by the pedals and shaft, the cable is put in longitudinal motion along its own length. The cable passes under idler wheels 30, 31, which are affixed to the hull by brackets 32, which idler wheels are positioned by turnbuckle-type adjusters 33 to properly tension the cable. Another similar set of idler wheels 34, 35 also affixed to the hull by brackets 32 are disposed near the rear of the hull, and change the direction of the cable so that it passes upwardly to a shaft drive wheel 36 near the rear of the hull. This shaft drive wheel and the rest of the drive assembly are mounted to a foundation 37 which is itself securely attached to the hull. The shaft drive wheel 36 is affixed to an inner drive shaft 46 which is rotatably journaled in a bearing 47. A bevelled inner shaft drive gear 42, rigidly affixed to inner drive shaft 46 toward the rear of the shaft drive wheel, engages an idler gear 40. The idler gear 40 is mounted on the end of an idler shaft 38, this idler shaft being journaled in bearings 39.

Figure 11:
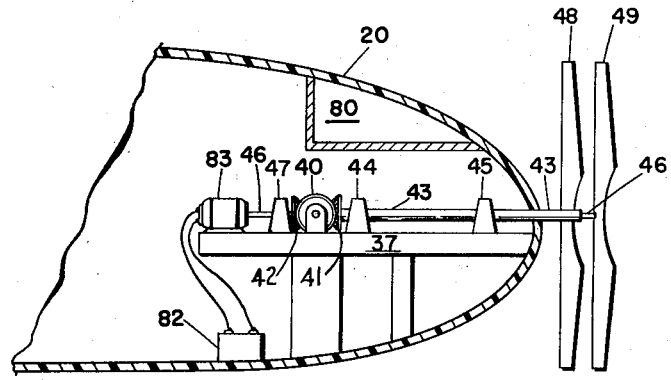
Fig. 11 is a partial side elevation of a variation of the invention.
Figure 6:
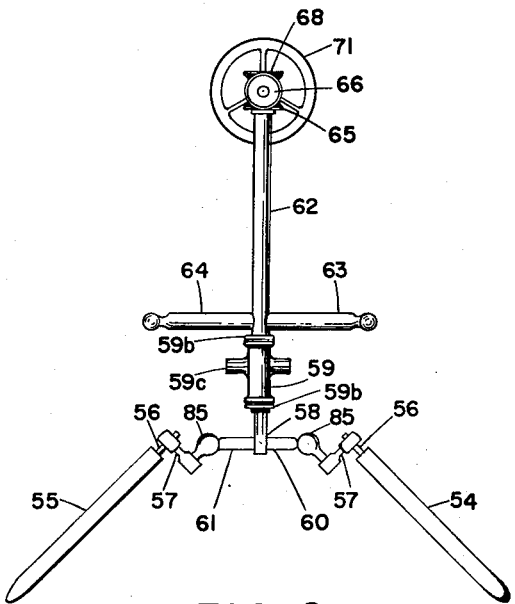
Fig. 6 is an end elevation taken at line 6—6 of Fig. 4.

In place of human power supplied by the operator, propulsive force can be supplied by an electric motor 83 powered by one or more electric batteries 82. In this arrangement the motor is preferably linked directly to shaft 46 as shown in Fig. 11. The battery and electric motor should be either water tight or enclosed in a water tight chamber such as 80.

An outer drive shaft 43 concentrically surrounds the inner drive shaft at the rear end thereof, and is journaled in bearings 44, 45. It has an outer shaft drive gear 41 which meshes with idler gear 40, said outer shaft drive gear 41 facing opposite to inner shaft drive gear 42 on the idler gear. The inner and outer drive shafts are thereby counter-rotatively mounted.

The drive shafts are further separated from each other at the rear of the boat by an internal bearing (not shown) so as to be freely rotatable relative to each other. Also, in accordance with common practice a packing box (not shown) can be provided to seal the space between the outer drive shaft and the hull to keep water from entering the hull at that point. The internal bearing serves that purpose between the shafts.

A first propeller 48 is mounted to the rear of the outer drive shaft 43, and a second propeller 49 is affixed to the end of the inner drive shaft to the rear of the first propeller. The pitch of these propellers will be opposite, since they are counter-rotating and are to drive in the same direction.

A flood-and-drain cock 50 is provided at the bottom of the hull, having a valve 51 within it to control admission of water to the craft. The submersible is provided with four independently pivoted control vanes: left rear vane 52; right rear vane 53; left front vane 54; and right front vane 55. These vanes are fixed to rotatable shafts 56 which extend outward from the hull in the same plane as the vanes. The vanes are positioned at an angle of about 45° from the horizontal when in their normal position; that is, when in the attitude which directs the boat forward, straight and level. The leading edges of the vanes are swept backward 45° as at 54a (Fig. 4) so as to shed seaweed, although an angle as small as 30° has been found to be sufficient for this purpose. Each shaft 56 is connected to a bell crank 57 which extends down below the shaft and whose projecting arm is connected to a push rod so that movement of the bell crank adjustably tilts the vanes.

In order to obtain triaxial control of the boat, it is necessary that some combination of vane positions be attainable which will give a resultant moment about all three major axes of the craft by reaction with water as the boat moves therethrough. For convenience in discussion, these major axes will be denoted the longitudinal axis, which is generally disposed in the direction of the craft's travel, and a generally vertical and a generally horizontal axis. These three axes are mutually perpendicular. In order to obtain such resultant forces by the use of two vanes, said two vanes must be angularly spaced from each other about the longitudinal axis in such manner that planes which are generally parallel to the vanes when the vanes are in their normal position will intersect and form a dihedral angle other than 180°. If the vanes are substantially flat plates, their planes extended must make such an intersection.

A central control column 58 is rotatably mounted inside a sleeve 62 and has a lower horizontal control rod comprising two bars rigidly affixed to the central column: lower left bar 60; lower right bar 61. The sleeve 62 surrounds the central control column. Two upper bars are attached to the sleeve, directed radially opposite from each other, these being: upper left bar 63, and upper right bar 64. Control wheel 71 is rigidly mounted upon main drive bevel gear 66 by means of bolts 66a. Both wheel 71 and gear 66 are rotatably mounted upon stationary horizontal shaft 67 which is held against rotation by shaft 58 which extends through hole 67a through shaft 67. Central control column drive gear 68 is rigidly mounted on the top of the central control column 58 by means of key 70 and threaded cap 72. Central control column 58 passes through shaft 67 and sleeve drive bevel gear 65 which is attached to sleeve 62 by bolts 65a. Gear 65 meshes with the main drive gear 66 and bevel idler gear 69 which is rotatably mounted upon shaft 67 and held in place by threaded cap 73. Said gear assembly and central control column are supported by sleeve 62. The sleeve 62 is supported by universal joint 59 and bracket 59a. Collars 59b on the sleeve 62 hold the sleeve in place. Universal joint 59 is a sleeve like arrangement permitting rotary motion of the sleeve and central control column on the horizontal axis. On either side of the joint 59 are rod like projections 59c which are journaled in the bracket support 59a. This arrangement permits rotation of the entire control column in the plane of the longitudinal axis. The turning of the control wheel 71 about shaft 67 causes the upper bars and the lower bars to rotate with respect to each other.

The upper left bar 63 is connected to the left rear vane 52 by a push rod 74. The right rear vane 53 is connected to upper right bar 64 by push rod 75. The left front vane 54 is connected to the lower left bar 60 by push rod 76, and the right front vane 55 is connected to the lower bar 61 by push rod 77. The push rods are connected to the upper and lower bars by ball and socket joints 84.

Each push rod is connected by means of a ball and socket joint 85 to the end of a bell crank 57 which is operatively connected with its associated vane as listed above, so that movement of the push rod varies the angle of attack of the vane.

An upper air inlet-and-outlet cock 78 with a control valve 79 is provided at the top of the hull to allow the entry or exhaust of air to and from the hull.

The operation of this submersible craft will now be described. This submarine is not intended to provide dry compartments for the operator, but operates as a freely flooded submersible in which the occupants are otherwise provided with breathing air, and in which they themselves may expect to be submerged in water. This is advantageous in that the hull need not be designed to resist a high differential pressure between the normal inside air pressure tolerable by human beings, and the hydrostatic pressure resulting from the submergence of the submarine. Even moderate differential pressures, when exerted over the large area of the hull, result in large total forces tending to collapse the hull.

Since the water inside the submarine is at substantially the same pressure as that outside the hull, the structure exists primarily as a frame to hold the occupants, controls and propulsive mechanism, and to streamline the passage of the boat through the water. Therefore the boat itself can be made of much lighter construction than conventional submersibles, even to the extent of being built of a plastic-impregnated glass cloth. A submersible constructed as described having an overall length of 150 inches, width of 22 inches, and height of 42 inches, has been found to weigh but 155 pounds. When substantially full of water, the craft is slightly buoyant by virtue of integral buoyancy tanks 80 and 81.

In operation, the boat is placed in the water with its occupants inside the hull, and the pedals are operated. The device illustrated above shows but one operator position, between the pedals and the propellers although two or more may be placed in tandem relationship, both driving, if desired. As the boat moves, the flood cock is opened by the valve 51, and the boat allowed to fill entirely or partly with water. If partly flooded, the boat may cruise along near the surface, only partly submerged, the lifting forces on the vanes serving to "plane" the craft toward the surface. When more extensively flooded, or entirely flooded, the boat may sink to any desired level, such sinking and later rising also being aided by the reaction between the vanes and the water when the boat is in forward motion. During entry and draining of water, and when the boat cruises partly submerged, the upper air valve may be opened, if desired. Generally speaking, the craft operates at best advantage when rather close to equilibrium weight; that is to say, when the submarine has displaced water approximately equal to its dry weight plus that of its occupants.

By careful hydrodynamic design of the hull and the propellers, the efficiency, range, and endurance of the operator may be increased. In the operation of the pedal-equipped craft, for instance, a submerged speed of 6.3 M. P. H. has been attained, and, depending on air supply, the range of the operator in distance is limited only by his physical strength. At any rate, it is significantly greater than attainable by simple swimming, even with swimming fins.

It will further be noted that the counter-rotating propellers result in an almost complete lack of torque. This enables the boat to be built without such torque-compensating devices as inclined vanes and the like. These devices would cause needless drag if used.

The triaxial controls of this device are extremely simple and permit the maneuvering of the craft through any series of attitudes. The control surfaces comprise the four vanes described above, which are grouped in two pairs, one pair forward and one pair aft, each vane being independently hinged to the hull by the rotatable shafts 56. The vanes are preferably disposed below the central axis of the hull and preferably droop downward and outward from the horizontal in order that the two sets of vanes may provide complete triaxial maneuverability. It will be noted that these unique controls reduce steering to a one-hand job. This arrangement also permits stabilizer vanes to be dispensed with, along with their associated drag.

Figure 5:
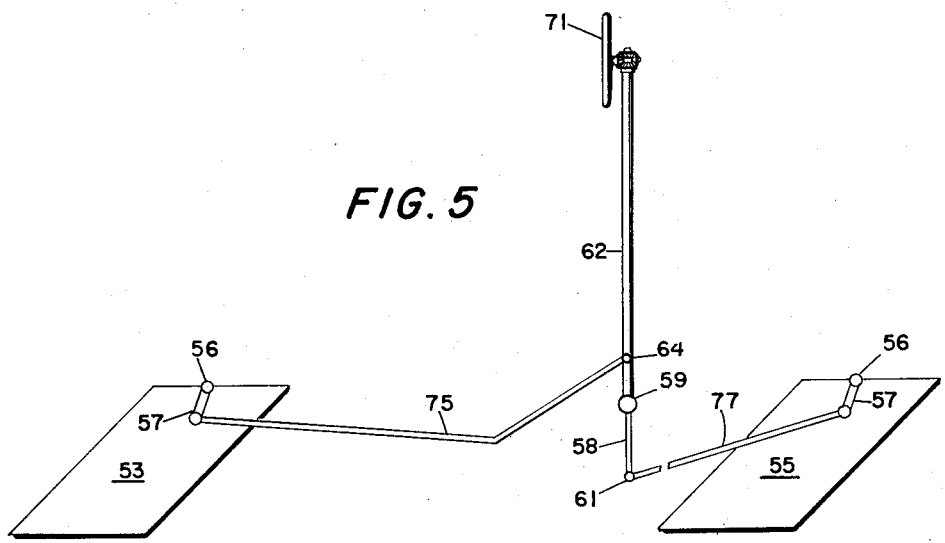
Fig. 5 is a side elevation taken at line 5—5 of Fig. 4.

The basic maneuvers about the three major axes of the boat will now be described. First consider the climb or dive. As best shown in Fig. 5, pulling back on the wheel 71 will pivot the central control column about the universal joint support 59 so that the two upper bars 63 and 64 are pushed backward and the lower bars 60 and 61 are pushed forward. This will cause the rear vanes to raise their rear edges and lower their forward edges, while the front vanes have their forward edges raised and their rearward edges lowered, thereby causing the submersible to climb. Pressing the wheel forward reverses these vane positions so that the boat goes into a dive.

Figure 9:
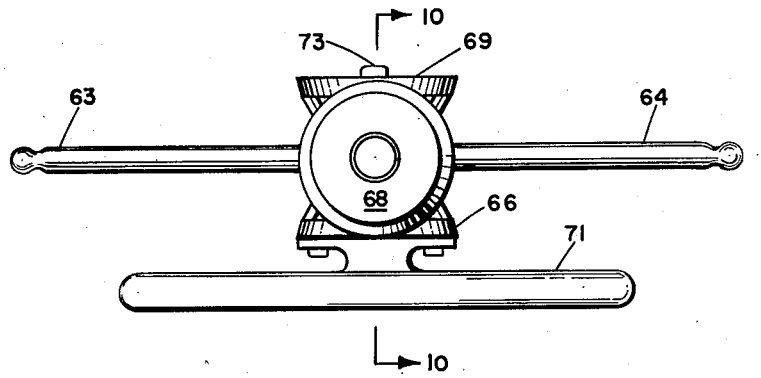
Fig. 9 is a plan of Fig. 7 taken at line 9—9 of Fig. 7.
Figure 10:
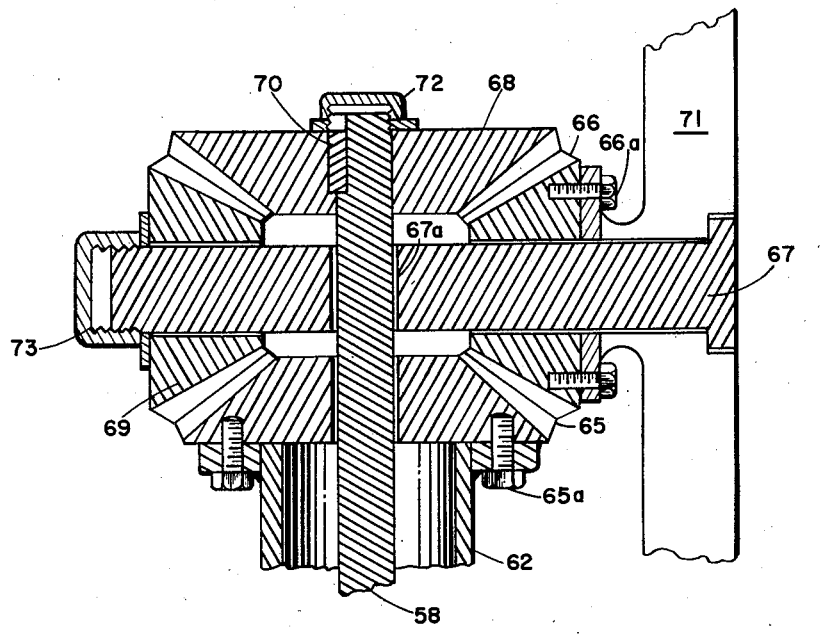
Fig. 10 is a section of the gear assembly of the central control column taken at line 10—10 of Fig. 9.

To roll the submersible, the control column is rotated about its central axis as seen in Fig. 9. Rotating the column clockwise causes a right roll, and counter-clockwise, a left roll. For example, the clockwise rotation of the column as seen in Fig. 9 moves the upper left bar 63 and the lower left bar 60 forward, and the upper right and lower right bars 61 and 64 rearward. This causes rod 74 to move forward, tilting the left rear vane upwardly with respect to the direction of motion and push rod 76 is moved forward, also causing the left front vane to tilt upwardly. Therefore, there is an effect on the left-hand side causing the boat to roll clockwise when one looks forward. On the right-hand side, push rod 75 is pushed back, causing the right rear vane to tilt downward, and push rod 77 is pulled back which also tilts the right front vane 55 downwardly, giving an additional component tending to roll the boat in the clockwise direction. To rotate the column in a counter-clockwise sense is to reverse the position of these vanes, causing the boat to roll in the other direction.

Figure 4:
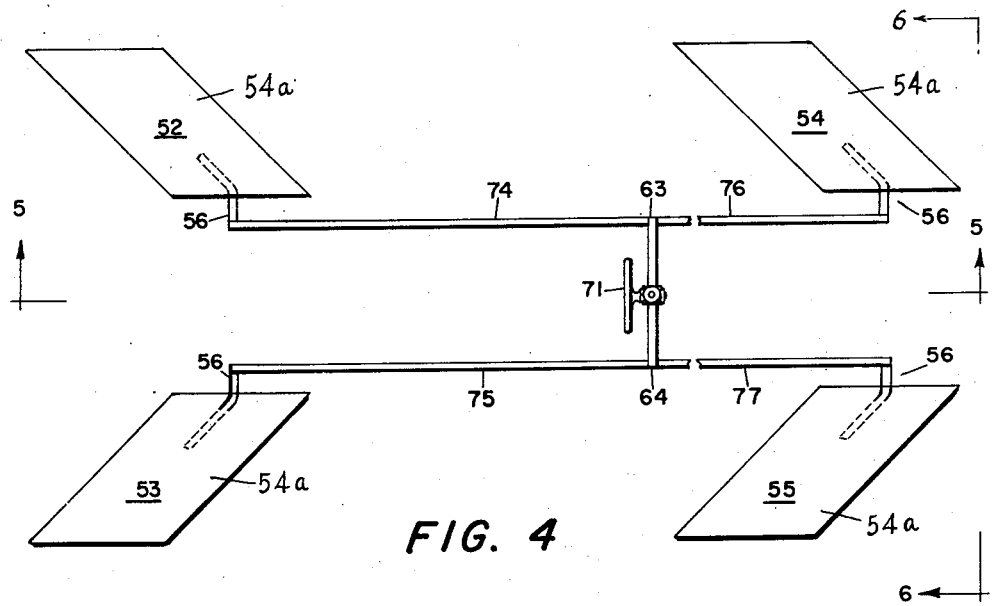
Fig. 4 is a plan schematic view of the control system for steering the boat.
Figure 7:
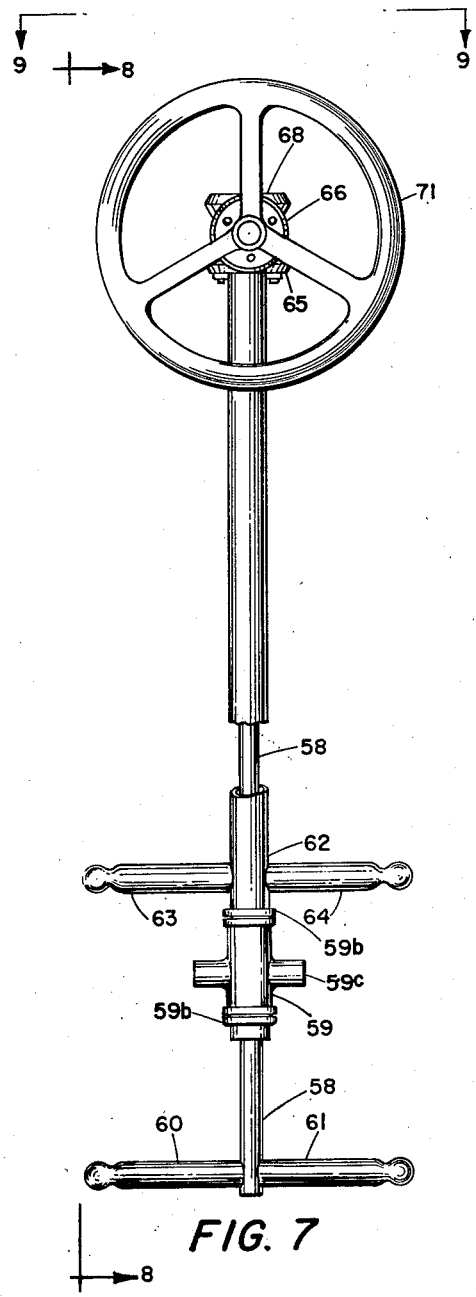
Fig. 7 is an elevation of the central control column.
Figure 8:
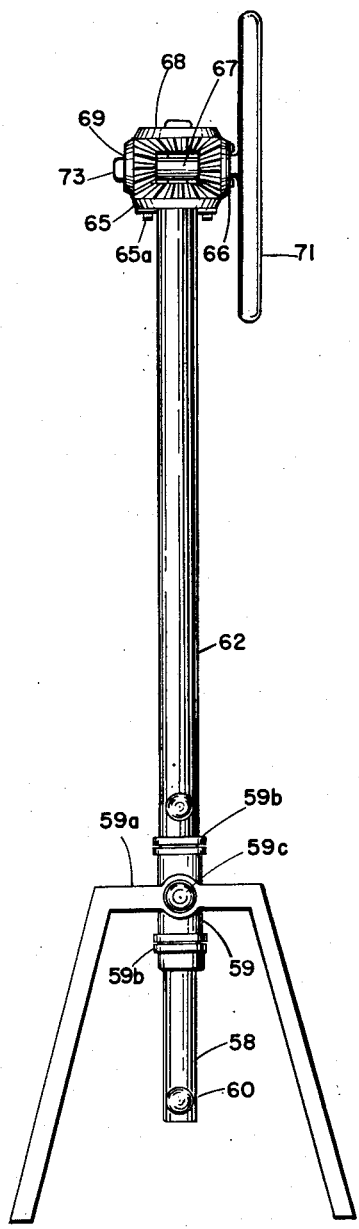
Fig. 8 is a side elevation of Fig. 7 taken at line 8—8 of Fig. 7.

Turning the control wheel 71 on its axis rotates the top cross bars with respect to the lower cross bars by means of the bevel gear assembly. Consider the wheel as seen in Fig. 7. Rotating the wheel counter-clockwise turns the boat to the left, while rotating it to the other direction directs the boat to the right. Counter-clockwise rotation causes the upper right bar 64 to be moved forwardly, thereby causing push rod 75 to raise the leading edge of the right rear vane, while upper left bar 63 will be moved rearwardly so that push rod 74 lowers the front end of the left rear vane 52. Examination of the drawings will indicate then that these two rear vanes are now tilted in a somewhat aligned manner so as to provide a resultant force which will move the rear of the boat to the right as seen in Fig. 4, thereby accomplishing a left turn. Turning the wheel in a clockwise direction reverses the above-described positions, and turns the boat in the other direction.

The above three basic movements of the control column are independent of each other, so that any desired resultant force may be attained, in any direction about any axis. Therefore, by use of these controls, the boat may be maneuvered into any position. Such paths as loop-the-loops, and the like, may be enjoyed. It will also be noted that the boat may be reversed by pedaling backward.

The steering control system of this invention is readily adaptable for use in larger conventional type submarine vessels. When used in conventional submarines this system replaces the commonly used bow planes, stern planes and rudder, with their independent control systems, with the highly versatile unitary control system and steering vanes of this invention thereby permitting the execution of all positional changes from a single station within the vessel. It will also be seen that the control system of this invention will permit such changes to be made in less time and in a smaller amount of space, thus, immeasurably increasing the maneuverability of the vessel. When used in such applications, the use of servo mechanisms and the substitution of mechanical power for operator power is desirable. Such modifications are considered to be within the scope of this invention.

Figure 12:
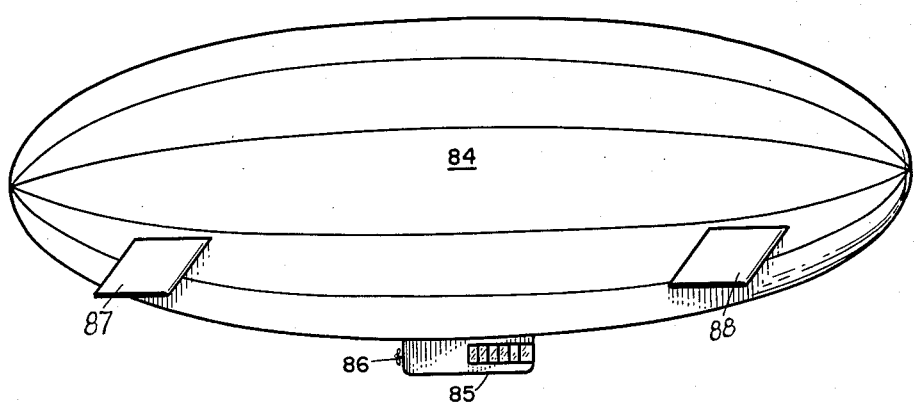
Fig. 12 shows a blimp having pivotally mounted vanes according to this invention.

This steering control system can also be used in lighter than air craft such as blimps, dirigibles, and like, in the identical manner employed in submarine vessels as shown in Fig. 12 wherein 84 is the hull of a blimp, 85 is the cabin and 86 is a conventional motor driven propeller for producing forward motion. A pair of pivotally mounted vanes 87 are provided at the aft end of the vessel and a second pair of vanes 88 provided at the forward end. These vanes correspond to vanes 52, 53, 54 and 55 of the submarine vessel shown in Figs. 2, 3, 4 and 5, and can be manipulated in the identical manner by identical means to produce triaxial movements.

To drain the boat at the surface, the operator moves the boat at a forward velocity, while opening the air and flood valves when near the surface, and while pulling back on the control column. The resultant force on the vanes "planes" the boat toward the surface, where the water inside will seek the outside level. When the hull is drained as desired, the lower flood valve will be closed.

The device has been shown equipped with pedal-propulsion. It has also been made up using electric motors and batteries for power as shown in Fig. 11. Such a construction has provided speeds up to 7.25 M. P. H.

As to breathing air for the occupants, there are many satisfactory conventional devices on the market such as lungs to be strapped to the back of the user. These form no part of the instant invention, and are not illustrated or further discussed here.

Also, the operator has been shown positioned between the pedal assembly and the drive shafts. Other physical arrangements could, of course, be devised.

This submersible craft is useful for reconnaissance, biological studies, sporting use, and greatly increases the endurance and range of a swimmer over that attainable by simple swimming. It also has a restricted cargo-carrying usefulness, such as for underwater search and salvage activities. It is lightweight and requires a bare minimum of structure.

Our invention is not to be construed as limited to the particular embodiment illustrated in the drawings and described in the description, which are given by way of illustration rather than of limitation and the invention is not limited except in accordance with the scope of the appended claims.

This application is a continuation in part of our co-pending application No. 388,562, filed October 27, 1953, now abandoned.

We claim:
1. A submersible boat adapted to be freely flooded when submerged in water comprising: a hull having a longitudinal axis extending in its direction of forward motion, and also a generally horizontal and a generally vertical axis, the axes being mutually perpendicular; a pair of drive shafts rotatably mounted in the hull; a propeller affixed to each drive shaft outside the hull; means for counter-rotating the drive shafts; means for flooding and draining the hull; a plurality of vanes pivotably mounted to the hull independently of each other and extending outwardly from the hull, said vanes having a normal position which maintains the boat in a level attitude, said vanes being so spaced angularly from each other around said longitudinal axis of the hull that when the vanes are in said normal position, planes generally parallel to said vanes intersect so as to include a dihedral angle other than 180° between them; and means for adjustably and individually pivoting each vane in its mounting, whereby the vanes are separately tiltable with respect to the hull and to each other and whereby said vanes may react with the water to exert a resultant force on the hull about any of the axes of the hull, the boat thereby being turnable in any manner.

2. A submersible boat according to claim 1 in which there are two pairs of vanes, one pair being disposed near the front and the other pair being disposed near the rear of the hull, the vanes of each pair extending outwardly and downwardly from the hull on opposite sides thereof.

3. A submersible boat adapted to be freely flooded when submerged in water comprising: a hull having a longitudinal axis extending in its direction of forward motion, and also a generally horizontal and a generally vertical axis, the axes being mutually perpendicular; a pair of drive shafts rotatably mounted in the hull; a propeller affixed to each drive shaft outside the hull; means for counter-rotating the drive shafts; means for flooding and draining the hull; two pairs of vanes, one pair being disposed near the front and the other pair being disposed near the rear of the hull, each of the vanes being pivotally mounted to the hull independently of the others and extending outwardly from the hull, said vanes having a normal position which maintains the boat in a level attitude, the vanes in each pair being so spaced angularly from each other around said longitudinal axis of the hull that when the vanes are in said normal position, planes generally parallel to said vanes and extended to meet each other intersect so as to include a dihedral angle other than 180° between them; and means for adjustably and individually pivoting each vane in its mounting, whereby the vanes are separately tiltable with respect to the hull and to each other and whereby said vanes may react with the water to exert a resultant force on the hull, the boat thereby being turnable in any manner, said last named means comprising a control column pivotally and rotatably mounted at a point intermediate of the ends of the column, a pair of bars rigidly affixed to and extending from opposite sides of the column below the pivotal mounting, a sleeve surrounding the column above the pivotal mounting and rotatable with respect to the column, a second pair of bars rigidly affixed to and extending from the sleeve on opposite sides thereof, means for turning the sleeve with respect to the column, a rigid member interconnecting each bar with an individual one of the vanes whereby longitudinal movement of the rigid member in response to movement of its bar changes the orientation of its vane with respect to the boat.

4. A submersible boat according to claim 3 in which the vanes in each pair extend outwardly and downwardly from the hull on opposite sides thereof.

5. A submersible boat according to claim 3 in which the vanes in each pair extend outwardly and downwardly from the hull on opposite sides thereof, each making an angle of approximately 45° with said horizontal axis.

6. A submersible boat according to claim 3 in which the means for turning the sleeve with respect to the column comprises a steering wheel rotatably mounted in the column, sleeve drive gear means rotatably mounted in the column, and a bevel gear drive operatively connecting said steering wheel and sleeve drive gear means, whereby rotation of the steering wheel moves the bevel gear drive to change the relative position of the sleeve and column.

7. A submersible boat according to claim 3 in which the means for counter-rotating the drive shafts comprises a crank and pedal assembly, a main drive member, a shaft drive member, a flexible means operatively connected between said drive members for turning the shaft drive member in response to rotation of the main drive member, and counter-rotative means operatively connected to the shaft member for transmitting counter-rotative motion to both drive shafts.

8. A submersible boat according to claim 3 in which the means for counter-rotating the drive shafts comprises a battery powered electric motor directly linked to a shaft drive member operatively connected to counter-rotative means for transmitting counter-rotative motion to the drive shafts.

9. A submersible boat according to claim 3 in which the means for flooding and draining the hull comprise valves disposed near the top and bottom of the hull.

10. A submersible boat according to claim 3 in which the drive shafts are coaxial.

11. A steering control system for vessels adapted to travel through fluid media which comprises a plurality of vanes pivotably mounted to the hull of said vessel independently of each other and extending outwardly from the hull, said vanes having a normal position which maintains the vessel in a level attitude, said vanes being so spaced angularly from each other around said longitudinal axis of the hull that when the vanes are in the said normal position, planes generally parallel to said vanes intersect so as to include a dihedral angle other than 180° between them; and means for adjustably and individually pivoting each vane in its mounting relative to the longitudinal axis of the hull, whereby the vanes are separately tiltable with respect to the hull and to each other and whereby said vanes may react with fluid to exert a resultant force on the hull about any of the axes of the hull, the vessel thereby being turnable in any manner.

12. A steering control system for vessels adapted to travel through fluid media which comprises a plurality of vanes pivotably mounted to the hull of said vessel independently of each other and extending outwardly from the hull, said vanes having a normal position which maintains the vessel in a level attitude, said vanes being so spaced angularly from each other around said longitudinal axis of the hull that when the vanes are in the said normal position, planes generally parallel to said vanes intersect so as to include a dihedral angle other than 180° between them; and means for adjustably and individually pivoting each vane in its mounting, relative to the longitudinal axis of the hull, said means comprising a control column, pivotably and rotatably mounted at a point intermediate of the ends of the column, a pair of bars rigidly affixed to and extending from opposite sides of the column below the pivotal mounting, a sleeve surrounding the column above the pivotal mounting and rotatable with respect to the column, a second pair of bars rigidly affixed to and extending from the sleeve on opposite sides thereof, means for turning the sleeve with respect to the column, a rigid member interconnecting each bar with an individual one of the vanes whereby longitudinal movement of the rigid member in response to the movement of its bar changes the orientation of its respective vane with respect to the vessel, whereby the vanes are separately tiltable with respect to the hull and to each other and whereby said vanes may react with fluid to exert a resultant force on the hull about any of the axes of the hull, the vessel thereby being turnable in any manner.

13. A steering control system according to claim 12 in which there are two pairs of vanes, one pair being disposed near the front and the other pair being disposed near the rear of the hull on opposite sides thereof.

14. A steering control system according to claim 12 in which the means for turning the sleeve with respect to the column comprises a steering wheel rotatably mounted in the column, sleeve drive gear means rotatably mounted in the column, and a bevel gear drive operatively connecting said steering wheel and sleeve drive gear means whereby rotation of the steering wheel rotates the bevel gear drive of the sleeve to change the relative position of the sleeve and column.

References Cited in the file of this patent

UNITED STATES PATENTS

| | | |
|---|---|---|
| 297,647 | Tuck | Apr. 29, 1884 |
| 1,232,241 | Diamond | July 3, 1917 |
| 2,396,494 | Donnell et al. | Mar. 12, 1946 |

FOREIGN PATENTS

| | | |
|---|---|---|
| 235,363 | Great Britain | June 18, 1925 |
| 773,313 | France | Sept. 3, 1934 |

OTHER REFERENCES

Popular Mechanics, September, 1946, pages 120, 121.

UNITED STATES PATENT OFFICE
CERTIFICATE OF CORRECTION

Patent No. 2,823,636                                February 18, 1958

Calvin A. Gongwer et al.

It is hereby certified that error appears in the printed specification of the above numbered patent requiring correction and that the said Letters Patent should read as corrected below.

Column 8, line 8, after "shaft" insert -- drive --.

Signed and sealed this 10th day of February 1959.

(SEAL)
Attest:

KARL H. AXLINE                                    ROBERT C. WATSON
Attesting Officer                                  Commissioner of Patents